April 25, 1967      F. D. LITTY      3,315,533
QUADRATURE TORQUE COMPENSATION FOR FLEXURE SPRING SUSPENDED GYRO
Filed Dec. 27, 1963      2 Sheets-Sheet 1

FRED D. LITTY
INVENTOR.

BY *S. A. Giarratana*
*Francis L. Masselle*
ATTORNEYS

United States Patent Office 3,315,533
Patented Apr. 25, 1967

3,315,533
QUADRATURE TORQUE COMPENSATION FOR
FLEXURE SPRING SUSPENDED GYRO
Fred D. Litty, Towaco, N.J., assignor to General Precision Inc., Little Falls, N.J., a corporation of Delaware
Filed Dec. 27, 1963, Ser. No. 333,945
7 Claims. (Cl. 74—5)

This invention relates to gyroscopic instruments, and more particularly to a gyroscopic instrument of the type in which the rotor of the instrument is supported on the end of a driving shaft by means of a flexible stem.

This application pertains to an improvement on devices of the type disclosed and claimed in copending application of Fred D. Litty, Ser. No. 131,461, filed on Aug. 7, 1961, now Patent No. 3,211,011 entitled, Inertial Compensation Mechanism for Flexure Spring Suspended Gyro, and assigned to the same assignee as the present invention.

In the gyroscope of the present invention, the spinning wheel or rotor is mounted on the end of a drive shaft by means of a flexible stem or "Hooke's joint" with the axis of the wheel normally colinear with the axis of the shaft, the flexible stem or joint permitting universal pivoting or deflection of the wheel about a flexure point on the shaft axis. When the wheel is deflected so that its axis is not colinear with the shaft axis, the flexible joint will exert a torque on the wheel tending to pivot it back to its normal position wherein the axis of the wheel is colinear with the axis of the driving shaft. This torque tends to precess the axis of the wheel about an axis normal to the axis of deflection if it is not canceled out by a compensating torque in the opposite direction. The aforementioned copending application describes a system for counterbalancing torque exerted by the flexible stem.

In addition to the torque exerted on the rotor by the flexible joint, there is another torque about an axis normal to the axis of deflection. This torque precesses the rotor towards a position in which the wheel axis is colinear with the shaft axis. This torque, called quadrature torque, is due to several energy losses in the system: molecular hysteresis and drag losses on the wheel caused by surrounding air and electromagnetic fields. To avoid precessional errors due to quadrature torques, a compensating torque in the opposite direction must be provided.

Prior to the present invention, the only known method to compensate for quadrature torque was by an eddy-current type torquer. This torquer was bulky and required electrical energy for operation.

In the aforementioned copending application there is described an inertial compensation system employing a plurality of weights connected to the rotor shaft by flexible columns and connected to the rim of the rotor by radial arms. The centrifugal forces generated by the weights are applied compressively to the radial arms. In the null position of the rotor, the arms and weights lie in the plane of rotation of the rotor so that no compensation force is provided. However, when the rotor precesses, the weights are no longer in the rotational plane thereof and the component of the compressive force acting along each radial arm produces a compensating torque canceling out the torque exerted by the flexible joint.

In the present invention the inertial compensation torque described in the copending application is mechanically phase-shifted relative to the axis of wheel deflection. In this way, a portion of the inertial compensation torque acts about the axis normal to the axis of deflection, and cancels the quadrature torque.

Thus, in a gyroscopic device wherein a rotor is coupled to a rotatable drive member by a flexible stem which enables deflection of the plane of rotation of the rotor and wherein means are provided to apply to the rotor a compensating torque opposing the restorative force generated by flexure of the flexible stem, the present invention contemplates the improvement which consists in a mechanical linkage for shifting the site of application of the compensating torque with respect to the axis of deflection of the rotational plane of the rotor so that a portion of the applied torque acts about an axis normal to such axis of deflection to compensate for quadrature torques.

In accordance with a particular feature of the present invention, the axial flexible columns employed in the inertial compensation system of the aforementioned copending application are attached to chordal link members instead of being attached to a disc on the drive shaft directly. One end of each chordal link member is pivotally connected to a web of the rotor and the other end of each chordal link member is connected to the end of rods projecting axially from the end of the drive shaft. When the rotor is normal to the shaft, which is its null position, the chordal link members and radial arms lie in a plane parallel to the plane of the rotor. When the rotor is tilted, the cross members deflect through an angle relative to the rotor and also deflect the radial arms realtive to the rotor. Weights are provided on the radial arms in a manner to compress the radial arms by virtue of the centrifugal force developed in the weights to provide the necessary compensating torque. The orientation of the radial arms and chordal link members is such that the compensating torque is applied about an axis other than the axis about which the wheel has precessed.

Accordingly, it is an object of the present invention to provide a highly linear inertial compensation system for a gyroscope of the type in which the wheel is supported on the end of a drive shaft by a flexible joint.

Another object of the invention is to provide a compensation system of the type described which is entirely mechanical.

It is a further object of the invention to provide an inertial compensation system for a gyroscope of the type described which applies a compensating torque even though the wheel is not deflected about the axis about which the compensating torque acts.

Other objects and features of novelty of the present invention will be specifically pointed out or will otherwise become apparent when referring, for a better understanding of the invention, to the following description taken in conjunction with the accompanying drawings, wherein.

Figure 1:
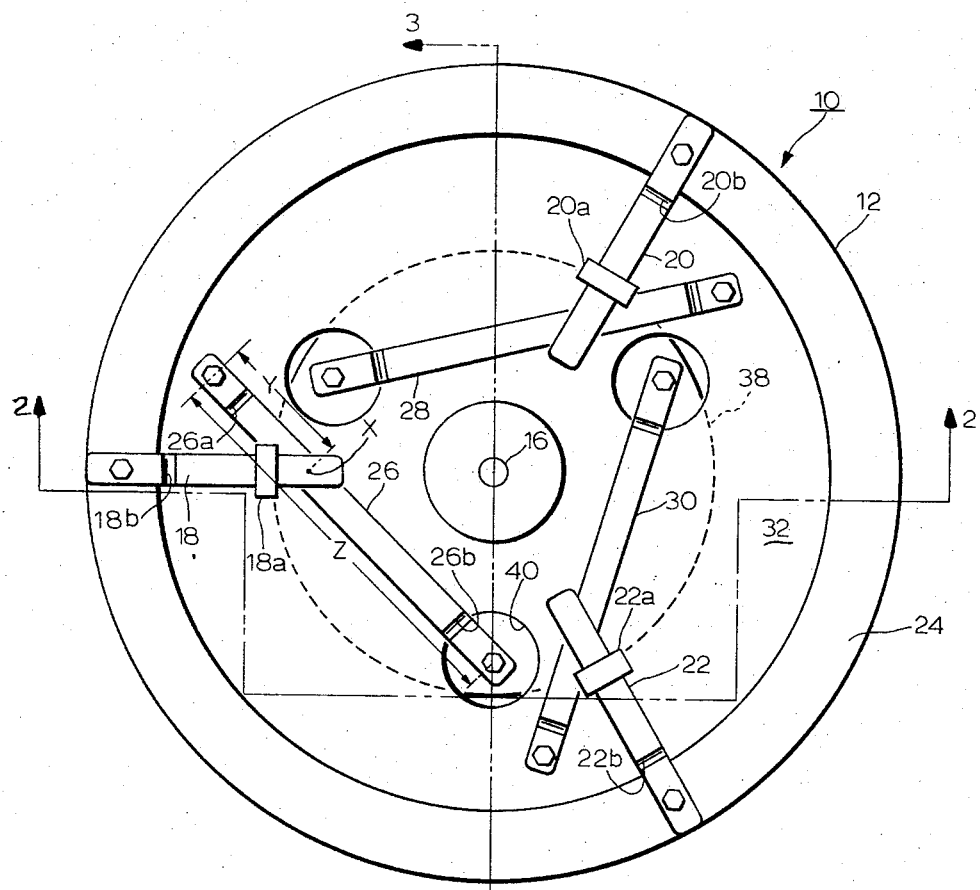
FIG. 1 is a plan view of a gyroscopic instrument embodying features of the invention.
Figure 3:
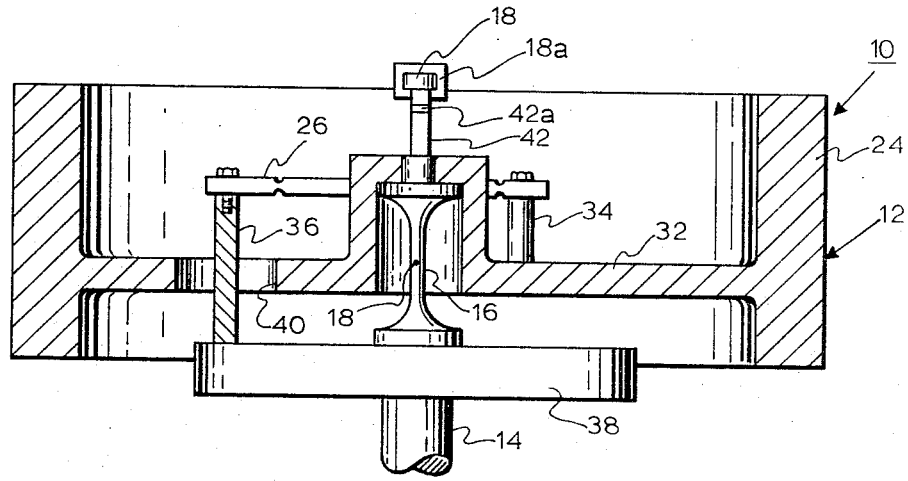
FIG. 3 is a sectional view taken along the line 3—3 of FIG. 1 with parts omitted as in FIG. 2.

Referring to FIGS. 1 and 3, a gyro 10 is shown which illustrates one embodiment of the invention. It comprises a wheel or rotor 12 which is coaxially connected to a drive member, shaft 14, by a flexible joint 16. Shaft 14 is suitably connected to the output shaft of an electric motor (not shown) so as to drive the assembly of the shaft 14 and wheel 12 at a high constant speed. Flexure joint 16 enables the wheel 12 to pivot universally with respect to the shaft 14 about a pivot point 18 on the shaft axis, as most clearly seen in FIG. 4. When wheel 12 is deflected so that its axis is not colinear with the axis of the shaft 14, the flexure joint 16 applies a quadrature torque to the wheel 12 which can be described as an erection torque tending to align the wheel spin axis with the shaft axis. This quadrature torque must be compensated for. To provide this compensation according to the present invention, three radially disposed compensating arms 18, 20 and 22, all of which appear in FIG. 1 only, are provided with their outer ends fixed to the rim 24 of wheel 12. The inner ends of the radial arms are connected to cross link members 26, 28 and 30, respectively, which extend chordally of wheel 12.

Link members 26, 28 and 30 have respective corresponding ends pivotally connected to the web 32 of the wheel, at points symmetrically spaced about the center of the wheel, and have respective opposite ends pivotally connected to shaft 14, in a manner hereinafter described, at points symmetrically spaced about the shaft axis. Inasmuch as the arrangement of each pair of radial arms and chordal links 18, 20, 22 and 26, 28, 30, respectively, is the same, only one will be described. At this juncture it is pointed out that, while three radial arm-chordal link assemblies are shown, a greater or lesser number can be used.

Figure 2:
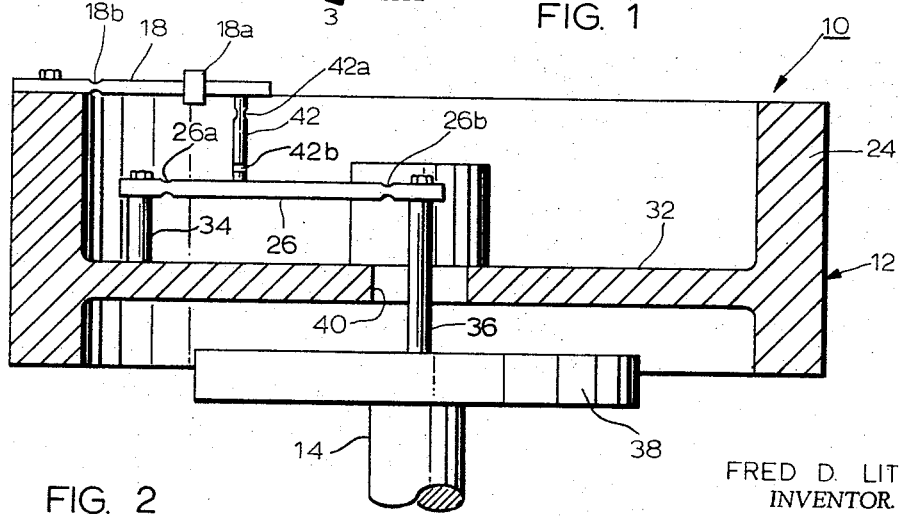
FIG. 2 is a sectional view taken along the line 2—2 of FIG. 1 with certain duplicate parts omitted for clarity.

Referring, then, to FIG. 2, an upwardly projecting boss 34 is provided on the upper surface of web 32. The height of boss 34 is substantially less than the vertical dimension of rim 24 above the web. Secured atop boss 34, as by means of a threaded fastener, is one end of chordal link 26, the other end of which is similarly fastened to the top of a rod-like extension 36 mounted eccentrically on a disc or annular flange 38 concentrically disposed on shaft 14. Rod 36 is parallel to the axis of shaft 14 and extends through an appropriately located and dimensional clearance aperture 40 in web 32. The length of rod 36 is such that it projects the same distance above the inner surface of web 36 as boss 34 when wheel 12 is in its normal or untilted position. Consequently, in this position, link 26 is level, lying in a plane perpendicular to the axis of shaft 14.

In order to achieve high flexural compliance in a plane parallel to shaft 14 and relatively low compliance in a plane perpendicular to the shaft, link 26 is provided with flex joints, consisting of segments 26a and 26b of reduced cross-section, adjacent its respective ends.

The pivotal connection of the inner end of radial arm 18 to link 26 is achieved by means of a connector link 42 which is provided with flex joints 42a and 42b adjacent its respective ends defining mutually perpendicular transverse pivotal axes in the connector link. In any suitable manner, the upper end of connector link 42 is secured to the underside of radial arm 18 adjacent its inner end the lower end of the connector link is secured to the upperside of link 26 intermediate its ends.

Figure 4:
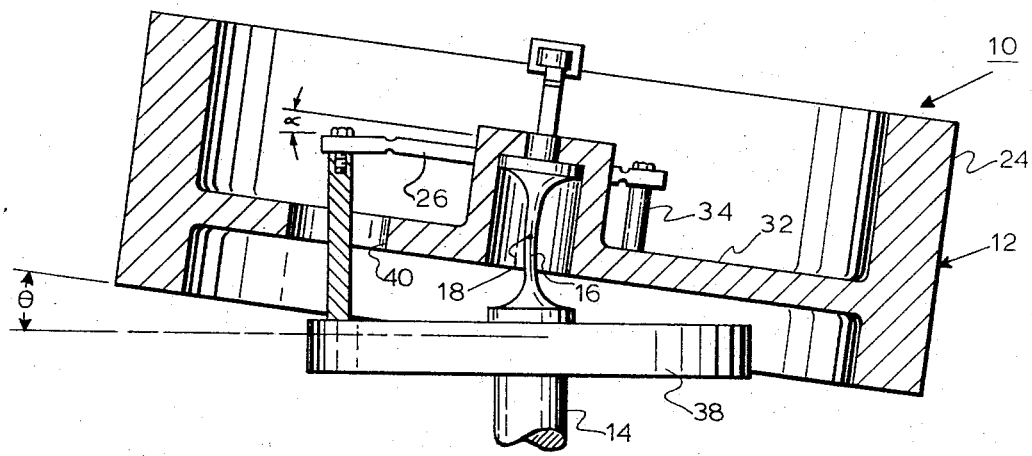
FIG. 4 is a view similar to FIG. 3 with the rotor shown in a tilted position, the angle of tilt being exaggerted for clarity of illustration.

Radial arm 18 is provided with a weight 18a adjacent its inner end and with a flex joint 18b adjacent its outer end, conferring flexibility in a vertical plane. When the wheel 12 is in its normal position wherein its axis is colinear with the axis of the shaft 14, each of the radial arms 18, 20, 22 and cross link members 30, 32, 34 lie in the plane of the wheel 12 so that all of the forces transmitted radially outward along the radial arms balance out and no compensating torque is provided. However, when the wheel 12 is deflected from its normal position as shown in FIG. 4, the radial arms and cross members no longer lie in the plane of the wheel. As illustrated in FIG. 4, the wheel is tilted through some angle $\theta$ which causes a deflection of the cross link member 26 through a smaller angle $\alpha$ relative to the plane of the wheel. The deflection of a point X (FIG. 1) at the juncture of the center lines of the radial arm 18 and cross link 26 out of the plane of the wheel is a function of the ratio $Y/Z$ and $\alpha$, Y being the distance between point X and the point of connection of the link to the wheel, and Z being the total distance between the respective connection points at the ends of link 26. $\alpha$ in turn is a function of the position of the shaft 14 and is a maximum in the position shown in FIG. 4.

With the cross link member 26 in the position illustrated in FIG. 4, it is apparent that the inner end of the radial arm 18 is raised and since the centrifugal force generated in the block 18a attached thereto is still directed out along the arm, the force acting on the arm can be broken down into a radially outward force component in the plane of the wheel and a small downwardly directed component perpendicular to the plane of the wheel. It is this latter component which produces the quadrature compensation in accordance with the present invention. It will be seen that this quadrature compensating force produces a compensating torque about an axis perpendicular to the axis about which the wheel has deflected in FIG. 4. The compensating torques provided by each of the radial arms 18, 20, 22 are cumulative and tend to precess the wheel 12 further in the direction that it is deflected from its normal position. Thus the total torque applied to the wheel 12 resulting from the centrifugal forces generated in the weights 18a, 20a, 22a act in opposition to the torque applied to the wheel 12 by molecular hysteresis and drag losses. Since the quadrature torque is comparatively small to begin with, no high degree of compensation is required. Therefore, weights 18a, 20a, 22a are very small and consequently the loading which they exert along the radial arms is negligible so that flexure fatigue is not a problem. Furthermore, the unique cross link members 26, 28, 30 of the present invention allow radial arms 18, 20, 22 to be oriented in a position in which the compensating torque is applied even though the wheel is not deflected in that direction.

As in my copending application, the radial arms 18, 20, 22 comprise metal bars which are substantially wider than they are thick to provide a rectangular cross-section. In one specific embodiment of the invention, these bars are .075" wide and 0.030" thick and the chordal links have similar dimensions. The arms and links are provided with segments of reduced cross-section, as previously described, to accommodate the necessary flexing of the arms.

The torque resulting from any one individual weight 18a, 20a, 22a will vary with the different angular positions of the weight relative to the plane of the wheel as the wheel rotates, reaching a maximum when it reaches the position of the weight associated with the arm 18 as shown in FIG. 4 because the point X is at its maximum displacement from the plane of the wheel and becoming zero when the weight is 90° removed from this position. Nevertheless the total torque resulting from all the weights combined will remain constant with different angular positions because of their uniform angular distribution.

The centrifugal forces generated by the masses of the radial arms 18, 20, 22 will add to the torque applied to the wheel 12 by the weights. The forces resulting from the resistance of the radial arms and cross link members to being bent when the wheel is deflected will subtract from the torque applied by the weights. Thus there are three types of torques introduced by the weights and the radial arms 18, 20, 22 that should be considered: (a) major inertal torques which are supplied by the centrifugal force of weights 18a, 20a, 22a; (b) minor inertial torques provided by the inertia of radial arms 18, 20, 22; and (c) static torques due to the bending of the radial arms and cross members. For small angles of deflection, the three types of torque result in a total torque which is linear with deflection.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a gyroscopic device wherein a rotor is coupled to a rotatable drive member by a flexible stem which enables deflection of the plane of rotation of the rotor relative to the drive member and means responsive to centrifugal force are provided to exert on the rotor a compensating torque opposing the restorative force exerted on the rotor by the flexible stem, the improvement which consists in a mechanical linkage for shifting the site of application of the compensating torque with respect to the axis of deflection of the said plane of rotation whereby a portion of said compensation torque acts about an axis normal to said axis of deflection to compensate for quadrature torques.

2. A gyroscopic device, comprising:
a rotatable drive member;
a discoid rotor;
means coaxially connecting said rotor to said member for conjoint rotation therewith in a plane normally perpendicular to the rotational axis of the drive member, said means enabling deflection of the plane of rotation of the rotor while exerting a restoring force thereon;
a link member having one end connected to said rotor adjacent its periphery and extending radially-inwardly therefrom, said one end being connected to permit pivotal movement of the link member in a radial plane of the rotor;
a mass secured to said link member; and
mechanical linkage means connecting the other end of said link member to said drive member and to said rotor at respective points angularly displaced from the radial plane of said link member, whereby a torque compensating for inertial and quadrature torque is generated by centrifugal acceleration of said mass and applied to said rotor.

3. A gyroscopic device, comprising:
a discoid rotor;
a rotatable member;
means coaxially connecting said rotor to said rotatable member for conjoint rotation therewith in a plane normally perpendicular to the rotational axis of said member, said means enabling deflection of the plane of rotation of the rotor while exerting a restoring force thereon;
a link member, extending chordally with respect to said rotor;
means connecting said link member, adjacent its respective ends, to said rotor and to said rotatable member; and
a second link member, extending radially with respect to said rotor, having one end connected to said rotor and the other end connected to the first said link member at a point intermediate the ends of said first link member.

4. A gyroscopic device, comprising:
a discoid rotor;
a rotatable member;
means coaxially connecting said rotor to said rotatable member for conjoint rotation therewith in a plane normally perpendicular to the rotational axis of said member, said means enabling deflection of the plane of rotation of the rotor while exerting a restoring force thereon;
a plurality of link members symmetrically disposed about, and extending chordally with respect to, said rotor;
means connecting said link members, adjacent their respective ends, to said rotor and to said rotatable member;
a like plurality of additional link members symmetrically disposed about, and extending radially with respect to, said rotor, each of said additional link members having one end connected to said rotor and the other end connected to a respective one of the first said link members at a point intermediate the ends of the first link member; and
a respective mass secured to each of said additional link members at a distance from the ends connected to said rotor.

5. A gyroscopic device, comprising:
a discoid rotor;
a rotatable member;
means coaxially connecting said rotor to said rotatable member for conjoint rotation therewith in a plane normally perpendicular to the rotational axis of said member, said means enabling deflection of the plane of rotation of the rotor while exerting a restoring force thereon;
a plurality of flexible link members symmetrically disposed about, and extending chordally with respect to, said rotor, each of said link members individually being shorter than the particular chordal dimension of the rotor and having high compliance in their axial planes normal to the plane of the rotor;
means connecting said link members, adjacent their respective ends, to said rotor and to said rotatable member;
a like plurality of additional flexible link members symmetrically disposed about, and extending radially with respect to, said rotor, said radially-extending link members having high compliance in their axial planes normal to the plane of the rotor, the radially-outer ends secured to the rotor and their inner ends pivotally coupled to a respective one of said chordally-extending link members, intermediate the ends of the chordally-extending link members; and
a respective mass secured to each of said radially-extending link members at a distance from said outer ends thereof.

6. A gyroscopic device, comprising.
a discoid rotor including a rim portion and a web containing clearance aperture means therein;
a rotatable drive shaft;
flexible stem means coaxially connecting said rotor to said drive shaft for conjoint rotation therewith in a plane normally perpendicular to the rotational axis of the drive shaft, said means enabling deflection of the plane of rotation of the rotor while exerting a restoring force thereon;
rod means disposed in parallelism to said drive shaft, one end of said rod means being connected to the drive shaft at a radial distance from the shaft axis, the other end of said rod means projecting through said clearance aperture means in said web and terminating at a distance beyond the web when the plane of rotation of the rotor is undeflected;
eccentric mounting boss means on said web projecting from the web in the same direction and by the same amount as said rod means, said mounting boss means collectively being angularly displaced about said shaft axis from said rod means;
link means pivotally mounted at one end atop the mounting boss means and at the other end atop the rod means;
radial arm means, normally parallel to the undeflected plane of rotation of the rotor, having one end pivotally secured to the rim of said rotor and its other end projecting over the link means intermediate its ends;
connector link means, normally extending substantially perpendicular to, and pivotally connecting between, said other end of the radial arm means and link means; and
fly-weights mounted on each of said radial arm means at a distance from the rim of said rotor.

7. A gyroscopic device, comprising:
a discoid rotor including a rim portion and a web containing symmetrically distributed clearance apertures therein;
a rotatable drive shaft;
flexible stem means coaxially connecting said rotor to said drive shaft for conjoint rotation therewith in a plane normally perpendicular to the rotational axis of the drive shaft, said means enabling deflection of the plane of rotation of the rotor while exerting a restoring force thereon;

a plurality of rod members symmetrically disposed about said drive shaft in parallelism thereto, one end of each of said rod members being connected to the drive shaft at equal radial distances from the shaft axis, the other end of each of said rod members projecting through respective clearance apertures in said web and terminating at equal distances beyond the web when the plane of rotation of the rotor is undeflected;

a plurality of mounting bosses on said web symmetrically disposed about the center of the rotor and projecting from the web in the same direction and by the same amount as said rod members, said mounting bosses collectively being angularly displaced about said shaft axis from said rod members;

a plurality of link members, each mounted at one end atop a respective one of said mounting bosses and, at the other end, atop a respective one of said rod members;

a plurality of radial arms, corresponding in number to said link members, symmetrically disposed about said rotor in parallelism to its normal plane of rotation, each arm having one end pivotally secured to the rim of said rotor and its other end projecting over a respective one of the link members, intermediate its ends;

connector links, normally substantially perpendicular to, and pivotally connecting between, said other end of each radial arm and a respective link member; and fly-weights mounted on each of said radial arms at a distance from the rim of said rotor.

References Cited by the Examiner

UNITED STATES PATENTS 3,077,785  2/1963  Stiles _____ 74—5
3,211,011  10/1965  Litty _____ 74—5

FRED C. MATTERN, JR., *Primary Examiner.*

J. D. PUFFER, *Assistant Examiner.*